United States Patent
Janneck et al.

(10) Patent No.: US 8,311,161 B2
(45) Date of Patent: Nov. 13, 2012

(54) SPHERE DETECTOR PERFORMING DEPTH-FIRST SEARCH UNTIL TERMINATED

(75) Inventors: Jorn W. Janneck, San Jose, CA (US); Christopher H. Dick, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 817 days.

(21) Appl. No.: 12/488,175

(22) Filed: Jun. 19, 2009

(65) Prior Publication Data

US 2010/0322352 A1 Dec. 23, 2010

(51) Int. Cl.
*H04L 27/06* (2006.01)
(52) U.S. Cl. ........ 375/340; 375/262; 375/267; 375/341; 375/347
(58) Field of Classification Search .................. 375/262, 375/267, 340, 341, 347
See application file for complete search history.

(56) References Cited

U.S. PATENT DOCUMENTS

| | | | |
|---|---|---|---|
| 8,018,828 B2 * | 9/2011 | Song et al. | 370/203 |
| 2005/0138520 A1 | 6/2005 | Richardson | |
| 2007/0113149 A1 | 5/2007 | Krafft et al. | |
| 2008/0298493 A1 | 12/2008 | Kim et al. | |
| 2009/0063106 A1 * | 3/2009 | Burg et al. | 703/2 |

FOREIGN PATENT DOCUMENTS

| | | | |
|---|---|---|---|
| CA | 2 541 567 A1 | | 9/2007 |
| EP | 1 401 138 A1 | | 3/2004 |
| EP | 1 855 394 A1 | | 11/2007 |
| GB | 2 403 104 A1 | | 12/2004 |
| GB | 2 427 106 A | | 12/2006 |
| GB | 2427106 A | * | 12/2006 |
| WO | WO 00/41312 A1 | | 7/2000 |

OTHER PUBLICATIONS

Shim, Byonghyo et al., "Radius-Adaptive Sphere Decoding Via Probabilistic Tree Pruning" *Proc. of the IEEE 8th Workshop on Signal Processing Advances in Wireless Communications*, Jun. 17, 2007, pp. 1-5, IEEE, Piscataway, New Jersey, USA.

* cited by examiner

*Primary Examiner* — David Ometz
*Assistant Examiner* — Rahel Guarino
(74) *Attorney, Agent, or Firm* — LeRoy D. Maunu (57) ABSTRACT

Systems and methods detect a communication received at receiving antennas from transmitting antennas. Each transmitting antenna transmits a symbol in a constellation. A sphere detector performs a depth-first search until the depth-first search terminates in response to a terminate signal requesting the result from the sphere detector. The depth-first search evaluates respective distances of one or mode leaf nodes in response to the communication received at the receiving antennas. The depth-first search selects the result from these nodes in response to the respective distances. The result includes a selected leaf node that identifies a corresponding symbol in the constellation for each transmitting antenna, with this symbol detected as transmitted by the transmitting antenna.

20 Claims, 5 Drawing Sheets

SPHERE DETECTOR PERFORMING DEPTH-FIRST SEARCH UNTIL TERMINATED

FIELD OF THE INVENTION

The present invention generally relates to wireless communication, and more particularly to spatially multiplexed wireless communication.

BACKGROUND

Data can be transmitted electromagnetically between a transmitting and a receiving antenna where the transmitter encodes the data into a sequence of symbols selected from a symbol constellation. The transmitting antenna transmits the symbols and the receiving antenna detects the symbols.

Interference from noise and reflections corrupts the symbols received by the receiving antenna. For a maximum-likelihood detector, the receiver can compare the received signal with the expected received signal for all of the symbols in the constellation. The expected received signal that most closely matches the actually received signal provides the detected symbol.

The data transfer rate of electromagnetic communication increases by transmitting multiple symbols in parallel from multiple transmitting antennas. The detection of the multiple transmitted symbols improves by receiving the symbols with multiple receiving antennas.

For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The present invention may address one or more of the above issues.

SUMMARY

Various embodiments of the invention provide a system for detecting a communication received at receiving antennas from transmitting antennas. Each transmitting antenna transmits a symbol in a constellation. A sphere detector performs a depth-first search until the depth-first search terminates in response to a terminate signal requesting the result from the sphere detector. The depth-first search evaluates respective distances of one or mode leaf nodes in response to the communication received at the receiving antennas. The depth-first search selects the result from these nodes in response to the respective distances. The result includes a selected leaf node that identifies a corresponding symbol in the constellation for each transmitting antenna, with this symbol detected as transmitted by the transmitting antenna.

Various other embodiments of the invention provide a method for detecting a communication received at receiving antennas from transmitting antennas. Each transmitting antenna transmits a symbol in a constellation. A representation is input for the communication received at the receiving antennas. A terminate signal is input for requesting a result. A depth-first search of a tree for the communication is performed, including evaluating a respective distance of one or more leaf nodes of the tree in response to the representation of the communication. The depth-first search is terminated in response to the terminate signal requesting the result. The result is selected from the one or more leaf nodes in response to the respective distance. The result includes a selected leaf node identifying a corresponding symbol in the constellation for each transmitting antenna. The result is output including the symbols detected as transmitted by the transmitting antennas from the selected leaf node.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
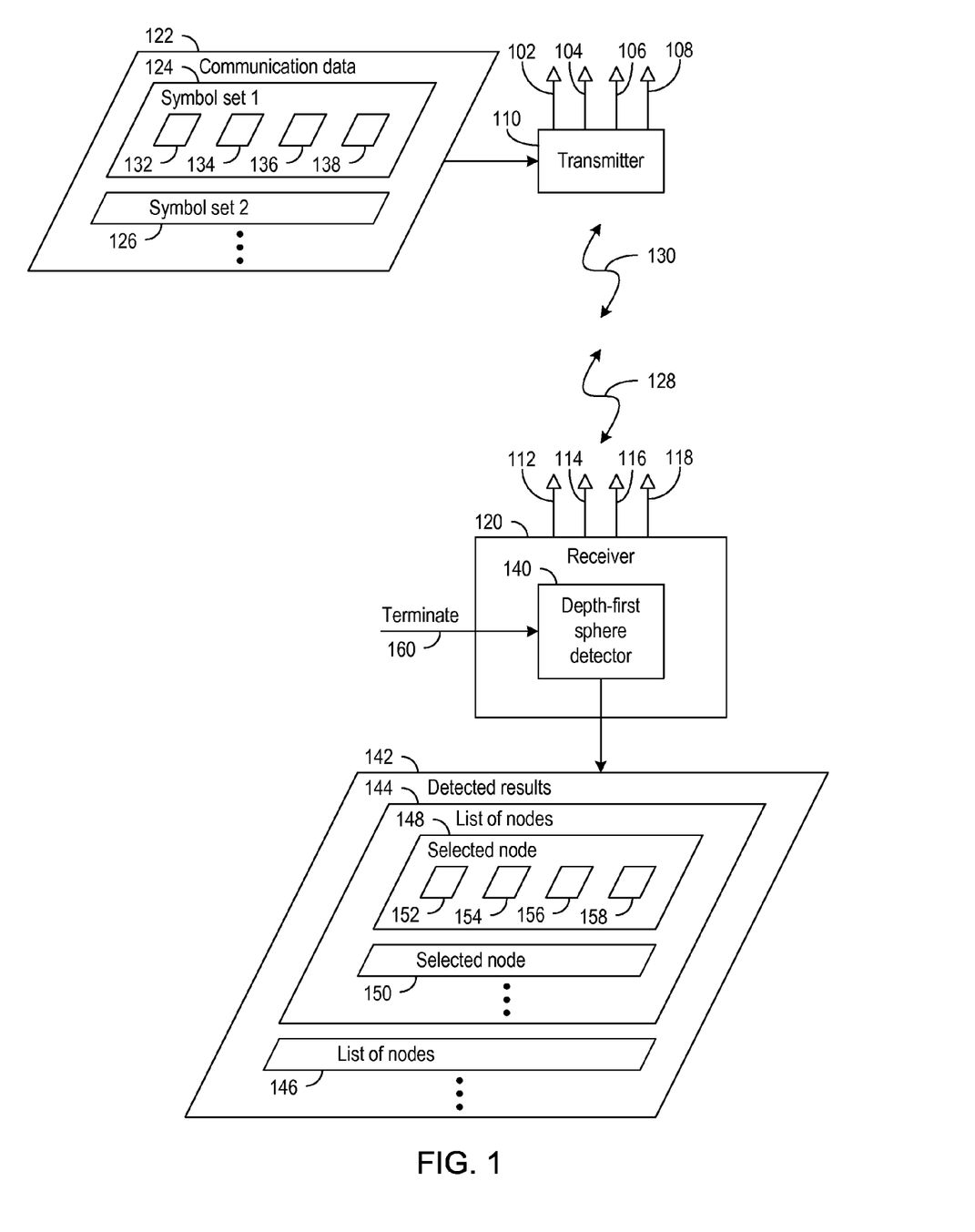
FIG. 1 is a data flow diagram of a system for communicating between transmitting antennas of a transmitter and receiving antennas of a receiver in accordance with various embodiments of the invention.

FIG. 1 is a data flow diagram of a system for communicating between transmitting antennas 102, 104, 106, and 108 of a transmitter 110 and receiving antennas 112, 114, 116, and 118, of a receiver 120 in accordance with various embodiments of the invention.

The transmitter 110 inputs a stream of data 122 including a sequence of sets 124 and 126 of symbols. In communication 128, transmitter 110 transmits set 124 of symbols 132, 134, 136, and 138. In communication 130, transmitter 110 transmits set 126 also including four symbols (not shown). For communication 128 of set 124, antenna 102 transmits symbol 132, antenna 104 transmits symbol 134, antenna 106 transmits symbol 136, and antenna 108 transmits symbol 138. Transmitter 110 transmits a respective symbol from each of antennas 102, 104, 106, and 108 during each communication 128 and 130.

For communication 128, receiver 120 receives a weighted sum of the transmitted symbols 132, 134, 136, and 138 at each of the receiving antennas 112, 114, 116, and 118. Thus, the symbols of the communication 128 are spatially multiplexed between the transmitting antennas 102, 104, 106, 108, and the receiving antennas 112, 114, 116, and 118. Depth-first sphere detector module 140 detects the spatially multiplexed symbols in communications 128 and 130.

In one embodiment, depth-first sphere detector 140 generates a stream of detected results 142 that include lists 144 and 146 of detection candidates. List 144 includes one or more selected solution nodes 148 and 150 for set 124 of the transmitted data 122, and list 146 includes one or more selected solution nodes for set 126 of the transmitted data 122. The symbols 152, 154, 156, and 158 of selected solution node 148 likely match the respective symbols 132, 134, 136, and 138 of set 124 of the transmitted data 122, and the symbols of selected solution node 150 are a somewhat less likely match for these transmitted symbols 132, 134, 136, and 138 of set 124.

Noise in the communication 128 received at antennas 112, 114, 116, and 118 can cause somewhat less likely node 150 to be the actual match for the transmitted symbols. Thus, further processing, such as checking a forward error correcting code, selects between the more likely alternative solution nodes 148 and 150.

In another embodiment, depth-first sphere detector 140 generates a similar stream of detected results 142, but each list 144 and 146 includes only a single selected node, such as selected node 148 of list 144. Thus, depth-first sphere detector 140 detects that symbols 152, 154, 156, and 158 of selected solution node 148 match the symbols 132, 134, 136, and 138 of transmitted data set 124.

In various embodiments of the invention, the depth-first sphere detector 140 evaluates possibly matching solutions until all possible matching solutions are considered, or until the search for matching solutions is terminated by the terminate signal on line 160.

In one embodiment, the receiver 120 queues a series of communications 128 and 130 until the depth-first sphere detector 140 is ready to process each communication. If the depth-first sphere detector 140 is processing communications 128 and 130 slower than the arrival rate of these communications, the queue fills up. When the queue becomes nearly full, the queue asserts the terminate signal 160 to terminate the search for matching solutions. This allows the depth-first sphere detector 140 to increase the rate of processing the communications 128 and 130, such that the queue never overflows.

A model for the communication channel between the transmitting antennas 102, 104, 106, and 108 and the receiving antennas 112, 114, 116, and 118 is:

$$y = Hs + n$$

where H is an N×M channel matrix between the N receiving antennas and the M transmitting antennas, s is a column vector of M symbols transmitted from the transmitting antennas, n is a column vector of N received noise elements, and y is a column vector of N signals received at the receiving antennas. Each of the M transmitted symbols in column vector s is a symbol from a constellation having an order of w symbols.

In one embodiment, the channel matrix is decomposed into a triangular matrix. The triangular matrix is an upper triangular matrix from a QR decomposition of the channel matrix. The detection of the transmitted symbols includes determining the M symbols in column vector s that minimize the distance norm:

$$D(s) = \|y - Hs\|^2 = \|Q^H y - Rs\|^2 = \sum_{i=M}^{1} \left| y'_i - \sum_{j=i}^{M} R_{ij} s_j \right|^2$$

where H=QR, $QQ^H$=I, and y'=$Q^H$y. The summations derive from R being an upper triangular matrix. The outer summation from i=M down to 1 is a summation of a corresponding term for each of the transmitting antennas beginning from the last antenna. The corresponding term of the outer summation for each transmitting antenna is denoted as the partial distance for the transmitting antenna. The partial distance for a particular transmitting antenna with index i includes an inner summation of a weighting of the candidate symbols from transmitting antennas i to M. Thus, the QR decomposition permits calculating the distance norm D(s) for candidate symbols s by summing a partial distance for each index of a transmitting antenna, and the partial distance for each index is a function of the symbols having the same and larger indices.

Various embodiments of the invention detect the transmitted symbols by computing the distance norm for various combinations selected from all combinations of M symbols in the constellation. However, the search through the possible combinations can be terminated before all combinations are considered. The M symbols actually transmitted from the M transmitting antennas should match the considered combination that has the smallest value of the distance norm. Those skilled in the art will further recognize that sphere detector module 140 may be implemented as program code that is executable on a processor or microcontroller or as a circuit on a programmable logic device or application-specific integrated circuit.

Figure 2:
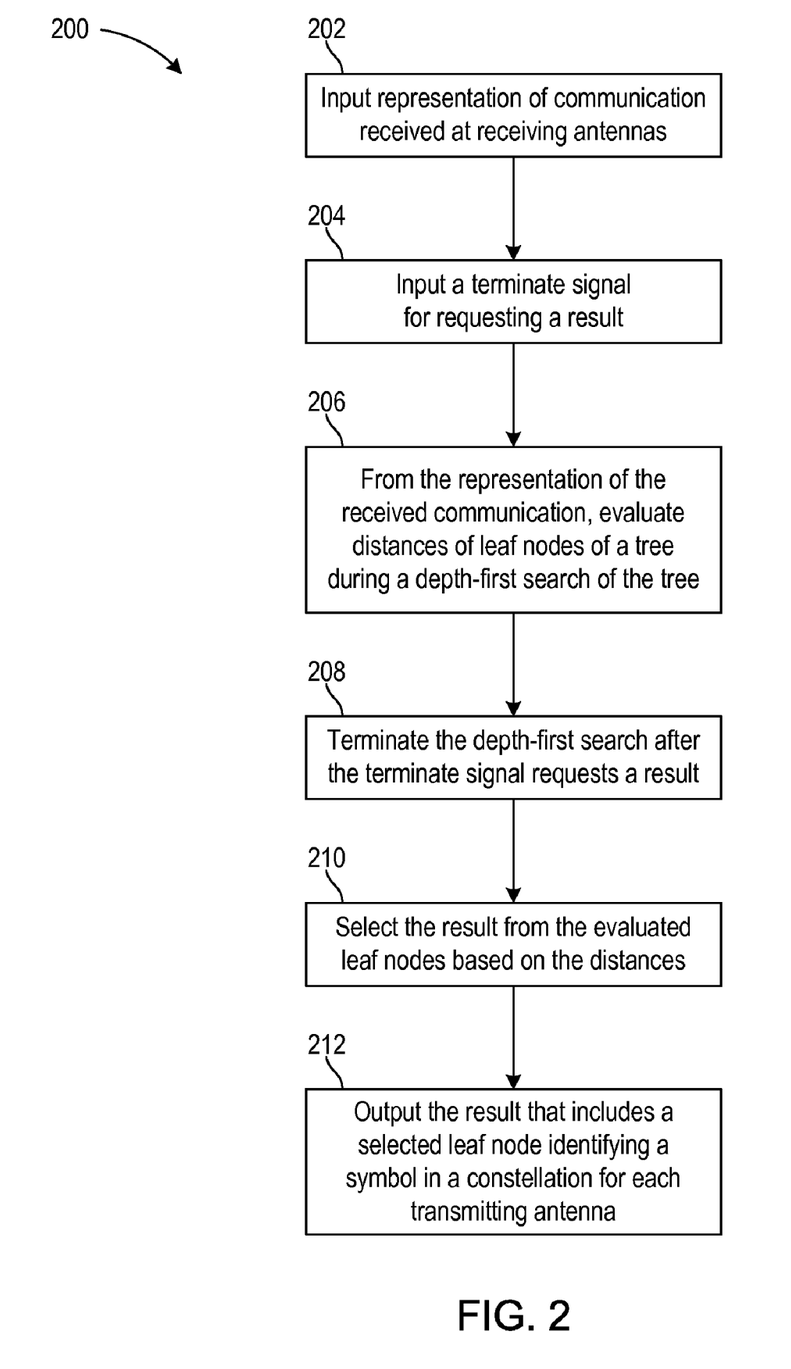
FIG. 2 is a flow diagram of a process for detecting a communication received at receiving antennas in accordance with various embodiments of the invention.

FIG. 2 is a flow diagram of a process 200 for detecting a communication received at receiving antennas in accordance with various embodiments of the invention. A result of detecting the communication is determined from a depth-first search of a tree, and the depth-first search terminates when a terminate signal requests the result of the depth-first search.

At step 202, process 200 inputs a representation of a communication received at the receiving antennas. At step 204, process 200 inputs a terminate signal that is asserted to request a result for the detected communication.

At step 206, a depth-first search evaluates partial distance of nodes in a tree of possible combinations of the transmitted symbols. When the depth-first search reaches a leaf node of the tree, the evaluated partial distance is a distance norm for the leaf node that indicates the likelihood that the transmitted symbols match symbols associated with the leaf node. Process 200 calculates the partial distances from the representation of the communication input at step 202.

At step 208, the depth-first search terminates when the terminate signal requests a result. At step 210, process 200 selects the result from the considered leaf nodes based on the evaluated distance. In one embodiment, the depth-first search updates a current result on evaluating each leaf node and the current result is returned when the terminate signal requests the result. In another embodiment, the depth-first search maintains a list of likely candidate leaf nodes for the transmitted symbols, and updates the list on evaluating each leaf node. The current list is returned when the terminate signal requests a result. At step 212, process 200 outputs the current single result or the list, including outputting a selected node that identifies a respective symbol for each transmitting antenna.

Figure 3:
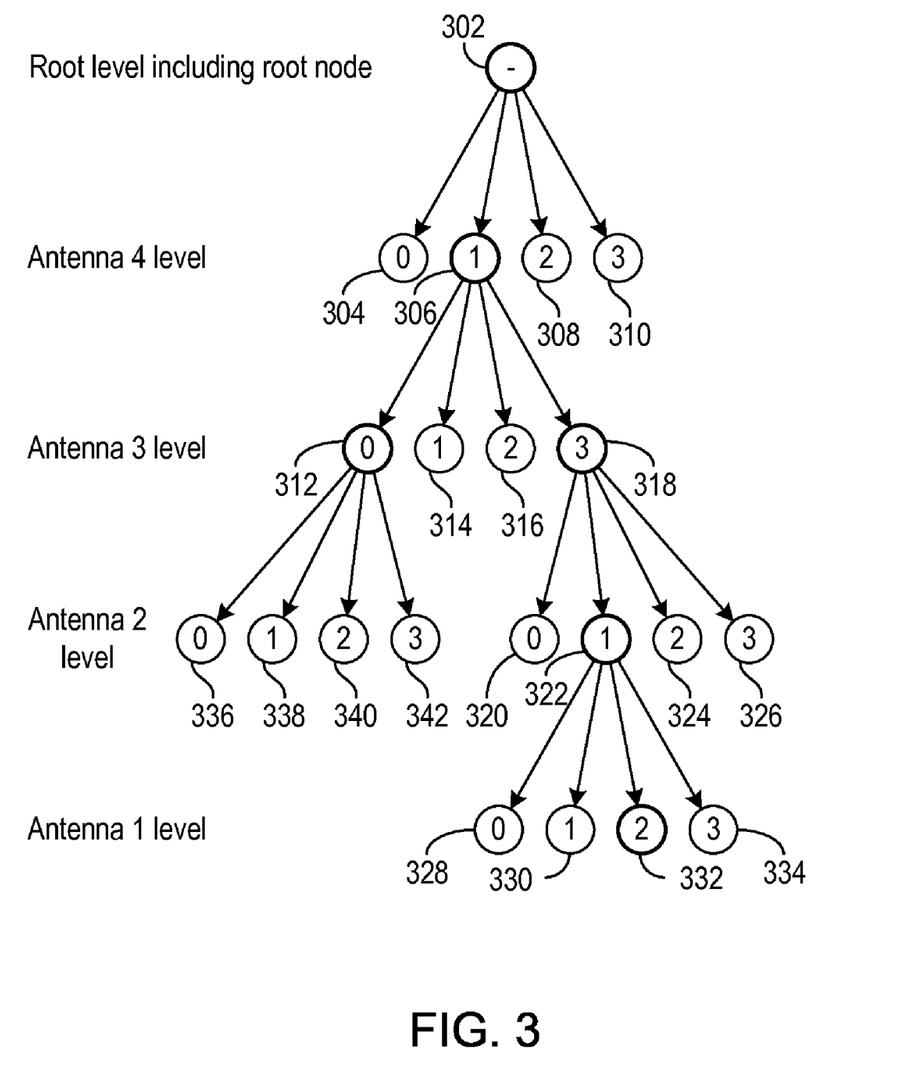
FIG. 3 is a graph diagram of a tree that is searched depth-first until terminated in accordance with various embodiments of the invention.

FIG. 3 is a graph diagram of a tree that is searched depth-first until terminated in accordance with various embodiments of the invention. Each node except the root node 302 includes a label specifying the symbol possibly transmitted from the corresponding transmitting antenna. Each path from the root node 302 to a leaf node, such as leaf node 332, represents a combination of symbols possibly transmitted from the transmitting antennas.

A depth-first-search sphere detector can perform an exhaustive search that visits nodes for every possible combination of symbols for the transmitting antennas. However, pruning can reduce the number of nodes actually visited, especially after visiting the node corresponding to the symbols actually transmitted from the transmitting antennas. In addition, the number of nodes visited is reduced by terminating the depth-first upon requesting a result.

The search begins from root node 302 of a root level of the search tree. Nodes 304, 306, 308, and 310 correspond to the four symbols in a constellation for the communication. Nodes 304, 306, 308, and 310 represent the four potential choices for the symbol transmitted from the antenna having index four. In one embodiment, partial distances are evaluated for the nodes 304, 306, 308, and 310 of the level for antenna four. Node 306 with the smallest partial distance is expanded into nodes 312, 314, 316, and 318 representing antenna three respectively transmitting symbol-0, symbol-1, symbol-2, and symbol-3, along with the antenna four transmitting symbol-1.

Among nodes 312, 314, 316, and 318, node 318 has the smallest partial distance and node 312 has the next smallest partial distance in this example. Node 318 with the smallest partial distance is expanded next into nodes 320, 322, 324, and 326 for the level of antenna two. Among these nodes, node 322 has the smallest partial distance and is expanded into the leaf nodes 328, 330, 332, and 334 of a leaf level of the search tree. Among these nodes, initial solution node 332 has the smallest distance and represents the antennas with indices one, two, three, and four respectively transmitting symbol-2, symbol-1, symbol-3, and symbol-1.

In one embodiment, the terminate signal requesting a result does not terminate the depth-first search unless the depth-first search has visited a leaf node. After the depth-first search finds the initial solution node 332, the depth-first search immediately terminates if a request for a result is pending, and the initial solution node 332 satisfies the request. If no request of a result is pending, the depth-first search continues to try finding a better result.

Because node 332 has a smaller distance than nodes 328, 330, and 334, nodes 328, 330, and 334 should not correspond to the symbols actually transmitted. Similarly, node 332 has a smaller distance than the partial distances of nodes 320, 324, and 326 in this particular example. If the depth-first search is not terminated, the depth-first search prunes nodes 320, 324, and 326, because the nodes that would result from expanding nodes 320, 324, and 326 would have a still larger distance than current solution node 332.

The depth-first search backtracks to nodes 312, 314, and 316. In this particular example, the depth-first search next expands node 312 because node 312 has a partial distance that is smaller than the distance of current solution node 332. However, the nodes 336, 338, 340, and 342 resulting from expanding node 312 have larger partial distances than the distance of current solution node 332, and consequently the depth-first search prunes nodes 336, 338, 340, and 342. Nodes 314 and 316 similarly have larger partial distances than the distance of current solution node 332, and the depth-first search prunes nodes 314 and 316. The depth-first search backtracks to nodes 304, 308, and 310. In this example, the depth-first search prunes nodes 304, 308, and 310 because they have a larger partial distance than the distance of current solution node 332.

Because no more nodes remain for expansion, the depth-first search completes and the first solution node 332 found is the final result. A complete depth-first search occurs when the terminate signal does not request a corresponding result before the depth-first search completes. In one embodiment, this final result is queued awaiting the terminate signal requesting the result, and another depth-first search begins to find another result for the next communication.

Figure 4:
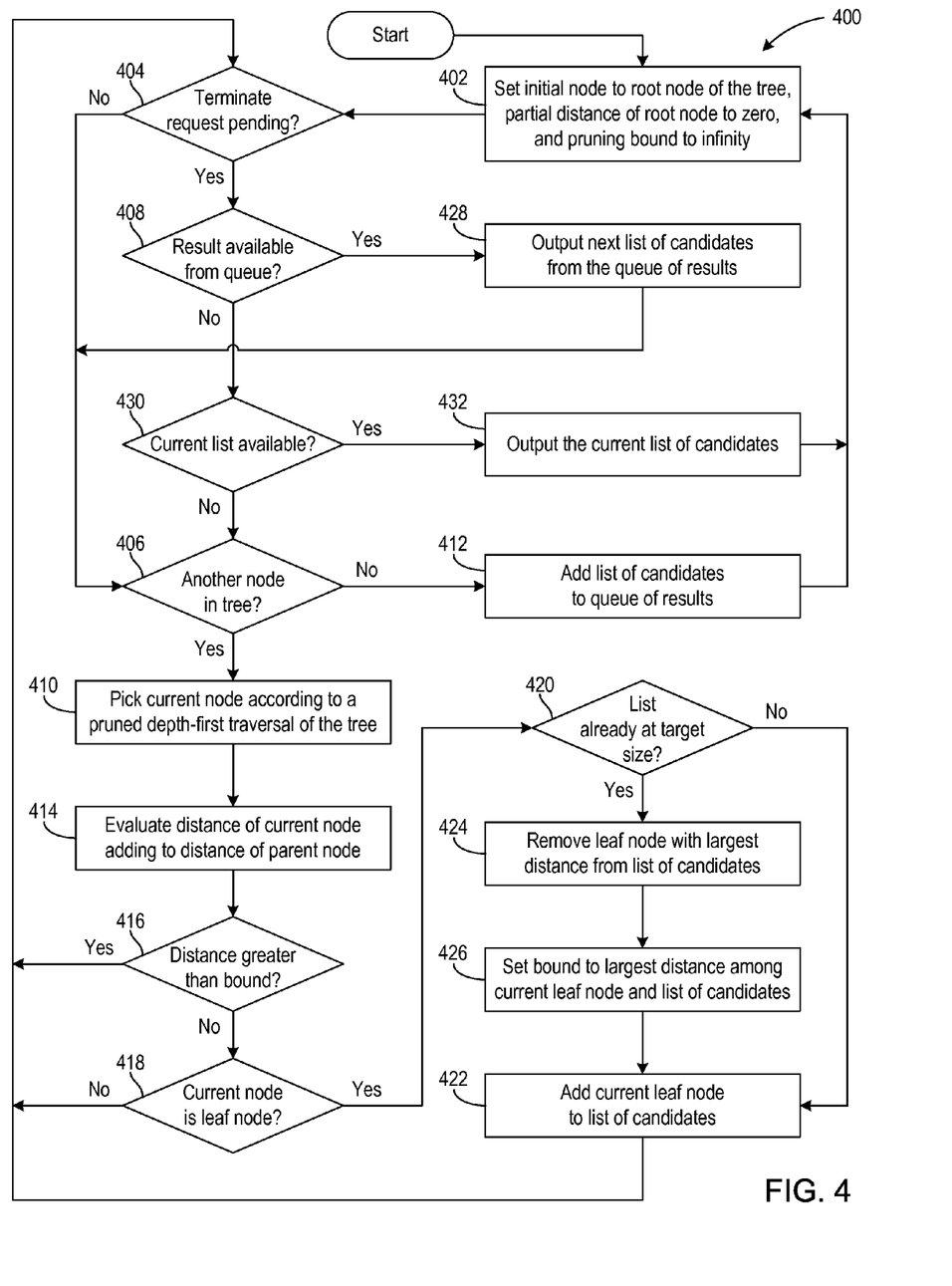
FIG. 4 is a flow diagram of a process for determining symbols communicated in accordance with various embodiments of the invention.

FIG. 4 is a flow diagram of a process 400 for determining symbols communicated in accordance with various embodiments of the invention. The communicated symbols are determined by depth-first search of a tree of possible symbols, but the depth-first search is terminated when a result is requested.

Step 402 initializes the depth-first search. The current node is set to the root node of the search tree, and a partial distance of the root node is set to zero. The pruning bound is set to infinity to disable pruning initially.

Decision 404 checks whether a terminate request is pending. If no terminate request is pending, process 400 proceeds to decision 406; otherwise, process 400 proceeds to decision 408 to return a result.

Decision 406 checks whether there are any more nodes to consider in the search tree. If more nodes remain in the search tree, process 400 proceeds to step 410 to evaluate the next node in the search tree. If the depth-first search has considered all the nodes in the search tree without receiving a terminate request, process 400 proceeds to step 412.

At step 410, process 400 selects a current node according to a depth-first traversal of the search tree. However, step 410 does not select any children and other descendents of a pruned node as discussed below. At step 414, a partial distance is evaluated for the current node. The partial distance adds a distance increment to the partial distance of the parent node for the current node.

Decision 416 checks whether the partial distance of the current node exceeds the current bound. If the partial distance of the current node does not exceed the bound, process 400 proceeds to decision 418. If the partial distance exceeds the bound, the current node is pruned and process 400 returns to decision 404 to consider the next node in the tree. Because descendants of a pruned node have a greater partial distance than the pruned node, the pruning eliminates consideration at step 410 of any descendants of the pruned node. In one embodiment, the depth-first search visits the nodes of the tree in a predetermined order that is subject to this pruning.

Decision 418 checks whether the current node is a leaf node. If the current node is a leaf node, then the current node specifies a combination of symbols that might match the actually transmitted symbols, and process 400 proceeds to decision 420 to add the current node to the result. Otherwise, process 400 returns to decision 404 to consider the next node in the tree.

Decision 420 checks whether a result list already includes a targeted number of results. As long as the list has less than the targeted number of results, process 400 adds each visited leaf node to the list at step 422. Otherwise, the list is already at the target size, and process 400 proceeds to step 424. At step 424, the leaf node in the list with the largest distance is removed from the list to be substituted with the current leaf node at step 422. After the list of solutions reaches the targeted number of leaf nodes, the bound is set at step 426 to the distance of the leaf node in the list with the largest distance.

Returning to step 412, the final list of solutions is added to a queue of detected results when the depth-first search completes considering all nodes in the search tree before receiving the terminate request. For each node considered, decision 404 checks whether a terminate request is pending as previously discussed.

Decision 408 checks whether the requested result is already available because the depth-first search is complete for a communication. If the requested result is already available in the queue, process 400 proceeds to step 428 to output the result list from the queue, and then process 400 resumes the depth-first search in progress for a subsequent communication. If the queue is empty, process 400 proceeds to decision 430.

Decision 430 checks whether some result is available to satisfy the termination request. If a list of solutions is available, process 400 proceeds to step 432. Otherwise, process 400 proceeds to step 406 to continue the current depth-first search until the first leaf node is visited, and then this leaf node is returned at step 432 to satisfy the request for a result. After outputting a result at step 432, the current depth-first search is terminated, and process 400 continues to step 402 to initialize another depth-first search for the next communication.

Figure 5:
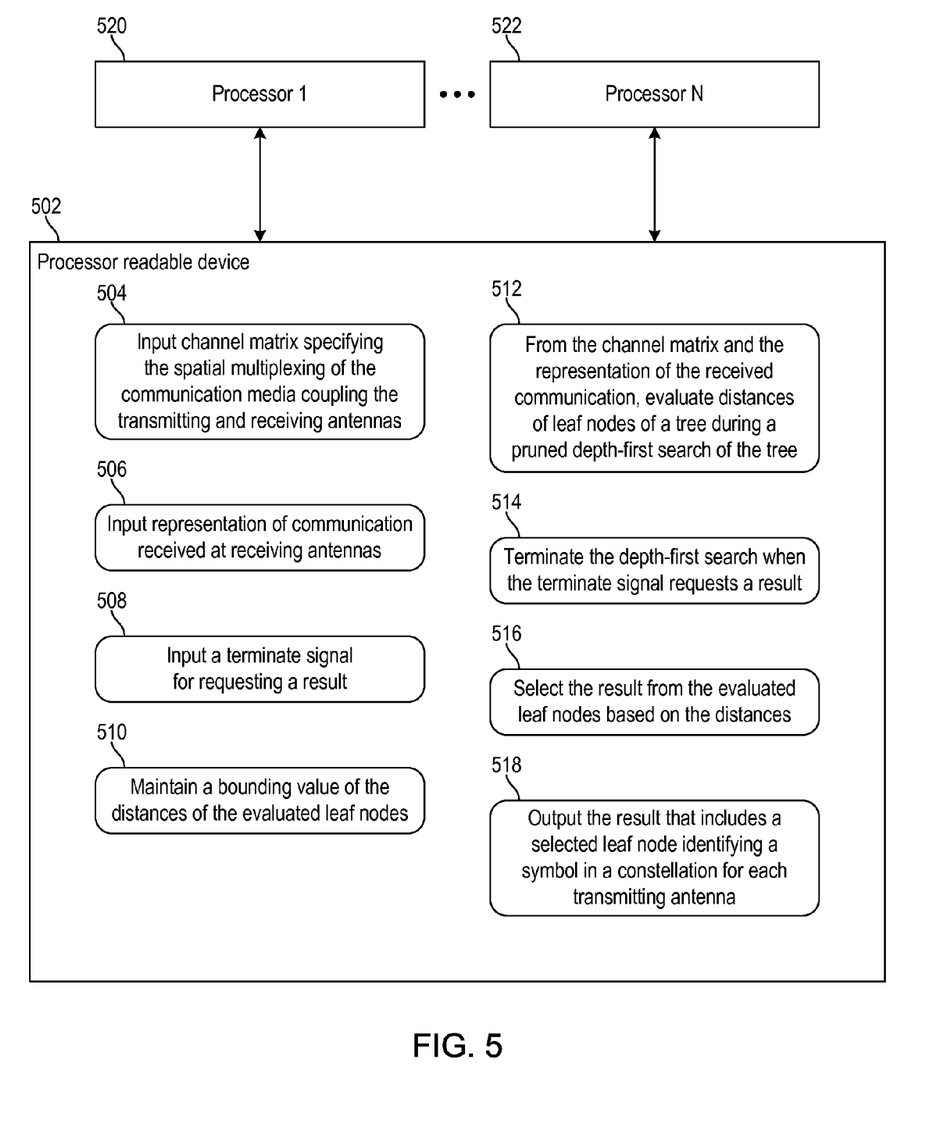
FIG. 5 is a block diagram of a system for communicating between transmitting and receiving antennas in accordance with various embodiments of the invention.

FIG. 5 is a block diagram of a system for communicating between transmitting and receiving antennas in accordance with various embodiments of the invention. A processor-readable device 502 is configured with software modules 504, 506, 508, 510, 512, 514, 516, and 518 for detecting a communication received at receiving antennas from transmitting antennas. The communication includes a corresponding symbol from a constellation for each of the transmitting antennas.

Execution of the instructions in software module 504 causes processors 520 through 522 to input a channel matrix specifying the spatial multiplexing of the communication media coupling the transmitting and receiving antennas. Execution of the instructions in software module 506 causes processors 520 through 522 to input a digital representation of the communication received at the receiving antennas. Execution of the instructions in software module 508 causes processors 520 through 522 to poll a terminate signal for requesting a result.

Execution of the instructions in software module 510 causes processors 520 through 522 to maintain a bounding value for the distances of evaluated leaf nodes. The bounding value helps prune a depth-first search of a tree for detecting the received communication.

Execution of the instructions in software module 512 causes processors 520 through 522 to evaluate partial distances of nodes during a pruned depth-first search of the tree. For evaluated nodes that are leaf nodes, the partial distance is a distance providing a relative likelihood that the transmitted symbols match symbols associated with the leaf node. The partial distances are determined from the channel matrix and the digital representation of the received communication.

Execution of the instructions in software module 514 causes processors 520 through 522 to terminate the depth-first search when a terminate signal requests a result from the depth-first search. Execution of the instructions in software module 516 causes processors 520 through 522 to select the result from the evaluated leaf nodes. The result is one or more of the leaf nodes having the smaller distances. In one embodiment, a current result is updated upon visiting each leaf node during the depth-first search.

Execution of the instructions in software module 518 causes processors 520 through 522 to output the result. The result includes a leaf node identifying a symbol in the constellation for each of the transmitting antennas.

In one embodiment, processors 520 through 522 are available to perform the depth-first searches and other operations of the system. Upon receiving each communication, an idle one of processors 520 through 522 is assigned to process the communication. It will be appreciated that a processor performing a low priority operation can also be assigned to process a received communication. If a new communication is received but none of processors 520 through 522 is available to process the communication, a terminate signal is generated to request a result from one of the processors 520 through 522 currently performing a depth-first search. When the processor returns a result, the processor is assigned to perform the depth-first search for the new communication.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network. In other embodiments, the sphere detector may be implemented, in whole or in part, as a circuit on a programmable logic device or an application-specific integrated circuit.

The present invention is thought to be applicable to a variety of systems for detecting communications received at multiple receiving antennas from multiple transmitting antennas. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for detecting a communication received at a plurality of receiving antennas from a plurality of transmitting antennas, each of the transmitting antennas transmitting one of a plurality of symbols in a constellation, the system comprising:

a sphere detector module responsive to a terminate signal for requesting a result, the sphere detector module performing a depth-first search until the depth-first search terminates in response to the terminate signal requesting the result, the sphere detector module performing the depth-first search that evaluates a respective distance of at least one node of a leaf level in response to the communication received at the receiving antennas, the sphere detector module performing the depth-first search that selects the result from the at least one node in response to the respective distance, wherein the result includes a selected node of the at least one node of the leaf level, and, for each of the transmitting antennas, the selected node identifies a corresponding one of the symbols in the constellation, with the symbol detected as transmitted by the transmitting antenna.

2. The system of claim 1, wherein:

the sphere detector module performs the depth-first search that maintains a current bounding value of the respective distance of each node already evaluated in the leaf level, and the sphere detector module performs the depth-first search that prunes a node in response to evaluating a distance of the node that exceeds the current bounding value.

3. The system of claim 1, wherein:

the sphere detector module performs the depth-first search of a tree of a plurality of nodes including the at least one node of the leaf level, the nodes arranged in a sequence of levels beginning with a root level and ending with the leaf level, each of the levels except the root level corresponding to a respective one of the transmitting antennas, and for each successive first and second one of the levels in the sequence, the second level includes a respective one of the nodes for each pairing of each node in the first level and each symbol in the constellation, the sphere detector module performing the depth-first search starting at a root one of the nodes of the root level of the tree.

4. The system of claim 3, wherein the sphere detector module performs the depth-first search that visits the nodes of the levels of the tree in a predetermined order, the predetermined order subject to pruning in response to evaluating a distance of a node in the predetermined order with the distance exceeding a current bounding value of the respective distance of the nodes already evaluated in the leaf level.

5. The system of claim 1, wherein the sphere detector module performs the depth-first search that concurrently evaluates the respective distance of a plurality of nodes of the leaf level.

6. The system of claim 1, wherein, in response to the terminate signal requesting the result, the sphere detector module completes the depth-first search that selects the result including the selected node, the selected node being a node from the at least one node that has a lowest value of the respective distance.

7. The system of claim 1, wherein, in response to the sphere detector module receiving the terminate signal before evaluating the respective distance of the at least one node of the leaf level, the sphere detector module performs the depth-first search that terminates after evaluating the at least one node that is only one node of the leaf level, and the sphere detector module completes the depth-first search that selects the result that is the selected node, with the selected node being the one node.

8. The system of claim 1, wherein, in response to the terminate signal requesting the result, the sphere detector module completes the depth-first search that selects a plurality of nodes from the at least one node, the plurality of nodes being a limited number of the at least one node having lower values of the respective distance, the result being the plurality of nodes and including the selected node.

9. The system of claim 8, wherein, in response to the sphere detector module receiving the terminate signal after evaluating the respective distance of the at least one node of the leaf level and before evaluating the respective distance of a target number of the plurality of nodes, the sphere detector module completes the depth-first search that selects the result that is the at least one node, the limited number being a number of the at least one node and the limited number being less than the target number.

10. The system of claim 8, wherein:
the sphere detector module performs the depth-first search that maintains a current bounding value that is a highest value of the respective distance within the limited number of the at least one node having lower values of the respective distance, and
the sphere detector module performs the depth-first search that prunes a node in response to evaluating a distance of the node that exceeds the current bounding value.

11. The system of claim 1, wherein, in response to the sphere detector module evaluating the respective distance for every node of the leaf level before receiving the terminate signal requesting the result, the sphere detector module completes the depth-first search and adds the result to a queue that later provides the result in response to the terminate signal requesting the result, and the sphere detector module begins performing another depth-first search that evaluates a respective distance of at least one node of the leaf level in response to another communication received at the receiving antennas.

12. The system of claim 11, wherein:
the sphere detector module performs the depth-first search that maintains a current bounding value of the respective distance of the nodes already evaluated in the leaf level, and
the sphere detector module performs the depth-first search that prunes a node in response to evaluating a distance of the node that exceeds the current bounding value, whereby the nodes of the leaf level descending from the node pruned are evaluated to have the respective distance that exceeds the current bounding value.

13. A method for detecting a communication received at a plurality of receiving antennas from a plurality of transmitting antennas, each of the transmitting antennas transmitting one of a plurality of symbols in a constellation, the method comprising:
inputting a representation of the communication received at the receiving antennas;
inputting a terminate signal for requesting a result;
performing a depth-first search of a tree having a leaf level that includes a plurality of leaf nodes corresponding to a plurality of combinations of symbols in the constellation, wherein the performing the depth-first search includes evaluating a respective distance of at least one leaf node of the leaf level of the tree in response to the representation of the communication received at the receiving antennas, the respective distance of each leaf node indicating a likelihood that the transmitting antennas transmitted the combination of symbols of the leaf node;
terminating the performing of the depth-first search in response to the terminate signal requesting the result;
selecting the result from the at least one leaf node in response to the respective distance, wherein the result includes a selected leaf node of the at least one leaf node of the leaf level; and
outputting the result including the selected leaf node that identifies one of the symbols in the constellation for each transmitting antenna, with the symbol detected as transmitted by the transmitting antenna.

14. The method of claim 13, further comprising inputting a channel matrix for describing a coupling medium between the transmitting antennas and the receiving antennas, wherein the evaluating of the respective distance of the at least one leaf node includes evaluating the respective distance of the at least one leaf node in response to the channel matrix and the representation of the communication received at the receiving antennas.

15. The method of claim 13, wherein:
the performing of the depth-first search of the tree includes performing the depth-first search of the tree having a plurality of nodes including the leaf nodes, the nodes arranged in a sequence of a plurality of levels, the sequence of levels beginning with a root level and ending with the leaf level, each of the levels except the root level corresponding to a respective one of the transmitting antennas, the root level including one of the nodes that is a root node of the tree, and
for each successive first and second one of the levels in the sequence, the second level includes a respective one of the nodes for each pairing of each node of the first level and each symbol in the constellation.

16. The method of claim 13, wherein the performing of the depth-first search of the tree includes maintaining a current bounding value of the respective distance of each leaf node already evaluated in the leaf level, and pruning each of a plurality of nodes of the tree in response to evaluating a distance of the node that exceeds the current bounding value.

17. The method of claim 13, wherein the selecting of the result includes selecting the selected leaf node to be the at least one leaf node having a lowest value of the respective distance.

18. The method of claim 13, wherein the selecting of the result includes selecting a plurality of leaf nodes from the at least one leaf node, the plurality of leaf nodes being a limited number of the at least one leaf node having lower values of the respective distance, the result being the plurality of leaf nodes and including the selected leaf node.

19. The method of claim 13, wherein the selecting of the result includes, in response to the evaluating of the respective distance for every leaf node of the leaf level before the terminate signal requests the result, adding the result to a queue that later provides the result in response to the terminate signal requesting the result, and then performing another depth-first search including evaluating a respective distance of at least one leaf node of the leaf level in response to another communication received at the receiving antennas.

20. An article of manufacture, comprising:
a processor-readable non-transitory device configured with instructions for detecting a communication received at a plurality of receiving antennas from a plurality of transmitting antennas, the communication including for each transmitting antenna a corresponding one of a plurality of symbols in a constellation, wherein execution of the instructions by a processor causes the processor to perform the following operations:
inputting a representation of the communication received at the receiving antennas;
inputting a terminate signal for requesting a result;
performing a depth-first search of a tree having a leaf level that includes a plurality of leaf nodes corresponding to a plurality of combinations of symbols in the constellation, wherein the performing the depth-first search includes evaluating a respective distance of at least one leaf node of the leaf level of the tree in response to the representation of the communication received at the receiving antennas, the respective distance of each leaf node indicating a likelihood that the transmitting antennas transmitted the combination of symbols of the leaf node;
terminating the performing of the depth-first search in response to the terminate signal requesting the result;
selecting the result from the at least one leaf node in response to the respective distance, wherein the result includes a selected leaf node of the at least one leaf node of the leaf level; and
outputting the result including the selected leaf node that identifies one of the symbols in the constellation for each transmitting antenna, with the symbol detected as transmitted by the transmitting antenna.

* * * * *